Jan. 11, 1927.
H. J. FERRIS
1,614,111
PULLMOTOR
Filed Jan. 22, 1926   2 Sheets-Sheet 1
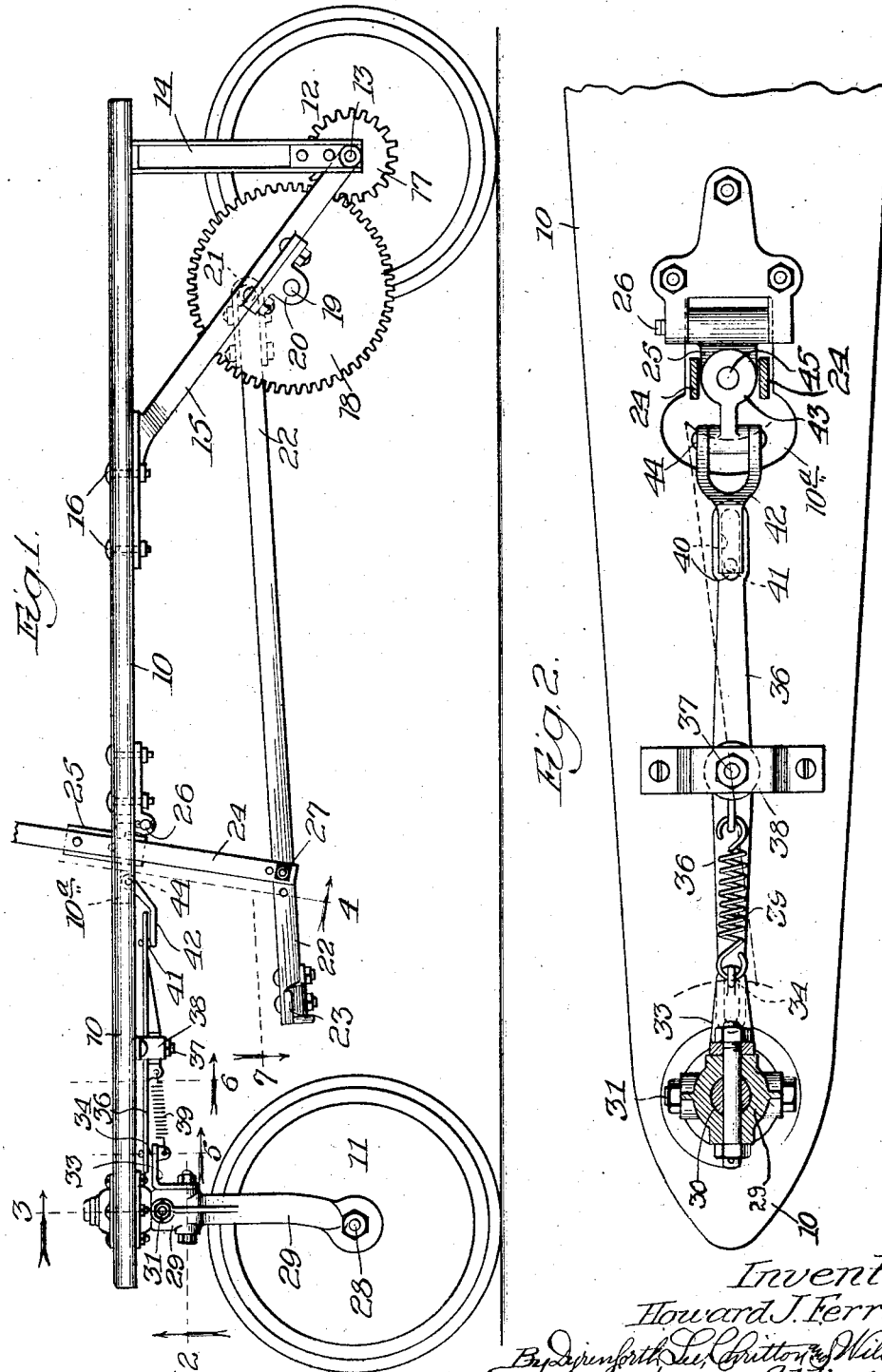
Inventor:
Howard J. Ferris, Jan. 11, 1927.  1,614,111
H. J. FERRIS
PULLMOTOR
Filed Jan. 22, 1926   2 Sheets-Sheet 2
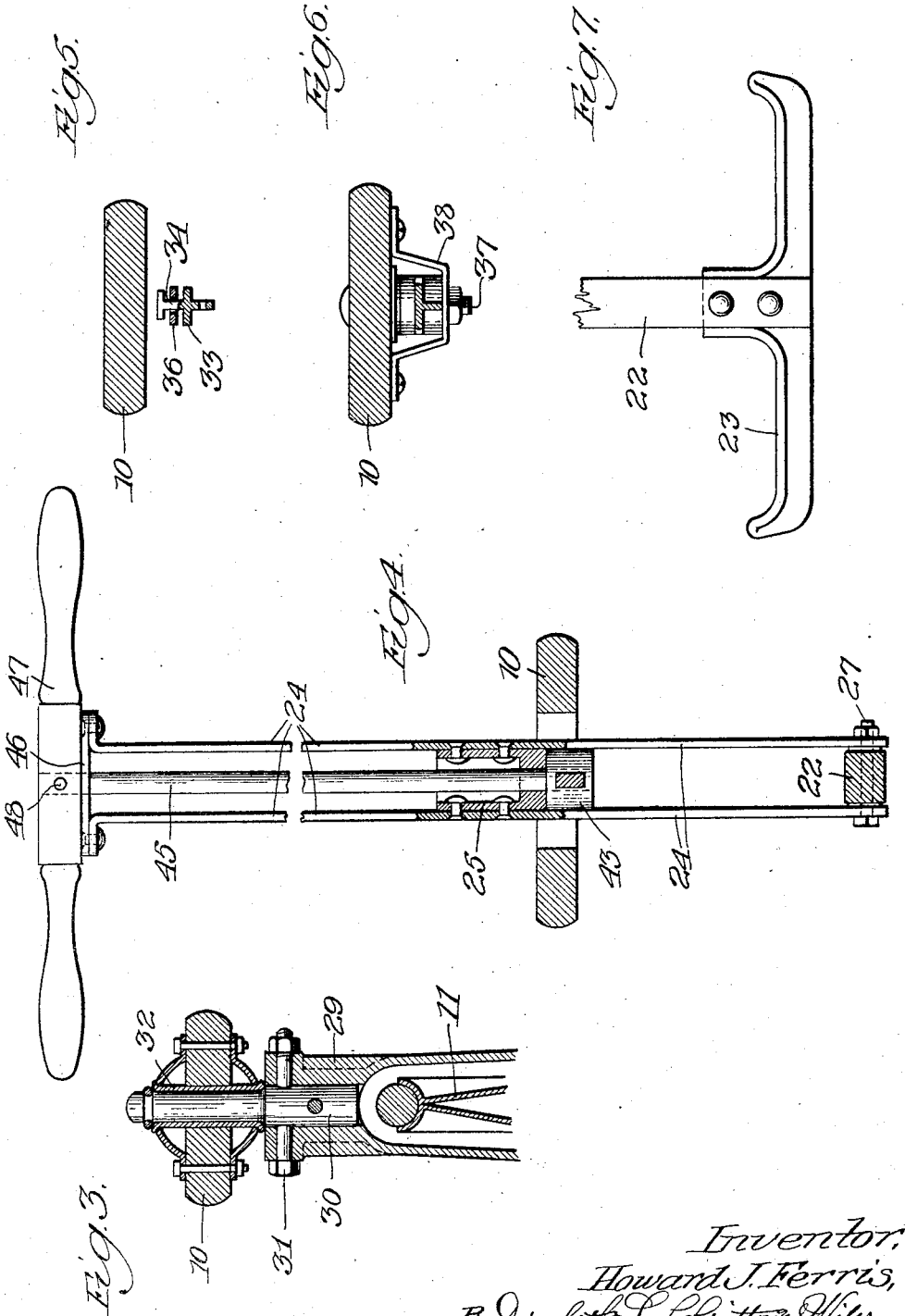

Patented Jan. 11, 1927.

1,614,111

UNITED STATES PATENT OFFICE.

HOWARD J. FERRIS, OF HARVARD, ILLINOIS, ASSIGNOR TO HUNT, HELM, FERRIS & COMPANY, OF HARVARD, ILLINOIS, A CORPORATION OF ILLINOIS.

PULLMOTOR.

Application filed January 22, 1926. Serial No. 83,012.

This invention relates to pullmotors and to similar wheeled toys which may be driven and steered by a single system of operating members.

The invention is fully described in the following specification and shown in the accompanying drawings, in which:

Figure 1 is a side elevation of the device showing the near rear wheel removed;

Fig. 2 is a partial enlarged plan view taken on the line 2 of Fig. 1;

Fig. 3 is a partial vertical section on the line 3 of Fig. 1;

Figs. 4, 5 and 6 are similar sections on the lines 4, 5 and 6 of Fig. 1; and

Fig. 7 is an enlarged partial top plan view of the cross bar for the feet as viewed on the line 7 of Fig. 1.

The embodiment illustrated comprises a passenger propelled toy wheeled vehicle having a flat seat 10 supported upon a front wheel 11 and two rear wheels 12. The rear wheels are secured to a rear axle 13 which is suitably journaled in a rear frame 14 which is secured to the underside of the seat 10 and has a brace 15 extending forwardly and secured to the seat 10 by means of bolts 16.

A pinion 17 is secured to the rear axle 13 and meshes with a gear 18 which is carried on a shaft 19, the latter being journaled in bars 20 which are carried by the brace 17. A wrist pin 21 is operably connected to the gear 18 and is grasped by the rear end of the pitman-rod 22, the forward end of this rod carrying a cross bar or pedal 23 as shown in Fig. 7.

An operating lever consisting of two parallel bars 24 extends through an opening 10ª in the seat 10 and is riveted to a casting 25, the latter being hingedly secured to the bottom of the seat 10 by means of a pin 26. The lower end of this operating lever is connected to the pitman-rod 22 by means of a bolt 27.

It will be seen from the foregoing that to propel the vehicle, the operator sits upon the rear end of the seat 10, places his feet upon the pedal 23 and, alternately pushes and pulls upon the upper end of the operating lever 24 and pushes with his feet upon the pedal 23, at the same time he pulls back upon the operating lever.

The forward wheel 11 is mounted upon a stationary axle 28 which is carried by the front fork 29 which is itself secured to a vertical shaft 30, as shown in Fig. 3, by means of a bolt 31. This shaft extends through a suitable bearing 32 which is carried by the forward end of the seat 10.

A lug 33 (Figs. 1 and 2) is secured to the fork 29 and carries a pin 34 which is adapted to engage a slot 35 in the forward end of the lever 36 which is centrally pivoted on the pin 37, the lower end of which is carried by the cleat 38 which in turn is secured to the lower surface of the seat 10. A spring 39 is attached to the lug 33 and tends to keep the front fork 12 turned so as to cause the front wheel 11 to follow a straight forward course.

The rear end of the lever 36 also contains a similar slot 40 which engages a pin 41 on a bracket 42, the latter being connected to a casting 43 by means of a horizontal pivot 44. The casting 43 is keyed or otherwise secured to a steering shaft 45 which is journaled at the bottom of the casting 25 and at the top in a member 46 which is riveted to the two upper ends of the bars 24. An operating and steering handle 47 is secured at the upper end of the shaft 45 by means of a pin 48.

Thus it will be seen that as the operator propels the wheel by grasping the handle 47 and moving the lever 24 back and forth so as to propel the vehicle, he can at the same time steer it by turning the handle 47 about the center of the shaft 45, thereby moving the front fork by means of the lever 36. The pivot 44 is placed substantially on a level with the pivot 26 of the lever 24 so that movement of the operating lever 24 back and forth will have very little effect upon the position of the front wheel so long as the shaft 45 is held in any given position.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a passenger-propelled vehicle, a seat, front and rear wheels carried thereby, means for driving the rear wheels including a hand-operated lever, a shaft carried by said lever, a lever arm carried by said shaft, a guide for the front wheel, a second lever arm on the front wheel guide, and a centrally pivoted lever extending longitudinally of said vehicle and operably connecting said lever arms for steering said front wheel.

2. In a passenger-propelled vehicle, a seat, front and rear wheels carried thereby, means for driving the rear wheels including a hand-operated lever, a steering shaft carried by said lever and operably connected to the front wheel for steering the same, and a spring normally in axial alignment with the axis of said front shaft tending to keep said steering wheel guided in a given direction.

3. In a passenger-propelled vehicle, a seat, front and rear wheels carried thereby, means for driving the rear wheels including a hand-operated lever, a shaft carried by said lever, a lever arm carried by said shaft, a second lever arm on the front wheel guide, a centrally pivoted lever operably connecting said lever arms for steering said front wheel, and a spring tending to keep said steering wheel guided in a given direction.

4. In a passenger-propelled vehicle, a seat, front and rear wheels carried thereby, means for driving the rear wheels including a hand-operated lever, a shaft carried by said lever, a lever arm carried by said shaft, a second lever arm on the front wheel guide, and a centrally pivoted lever having slots in its ends, said slots engaging pins on said lever arms for steering said front wheel.

5. In a passenger-propelled vehicle, a seat, front and rear wheels carried thereby, means for driving the rear wheels including a hand-operated lever, a guide for the front wheel, a shaft carried by said lever, a lever arm carried by said shaft, a second lever arm on the front wheel guide, and a centrally pivoted lever normally lying substantially in alignment with said lever arms and having slots in its ends, said slots engaging pins on said lever arms for steering said front wheel.

6. In a passenger-propelled vehicle, a seat, front and rear wheels carried thereby, a guide for the front wheel, means for driving the rear wheels including a hand-operated lever, a shaft carried by said shaft, a second lever arm on the front wheel guide, and a centrally pivoted lever mounted on the underside of said seat and having slots in its ends, said slots engaging pins on said lever arms for steering said front wheel.

HOWARD J. FERRIS.